United States Patent [19]

Bollinger et al.

[11] Patent Number: 4,744,154
[45] Date of Patent: May 17, 1988

[54] MEASURING AND CONTROLLING THE MOISTURE CONTENT OF HAIR

[75] Inventors: Heribert Bollinger, Worms; Siegfried Hollmann, Darmstadt; Detlef Mattinger, Hünfeld, all of Fed. Rep. of Germany

[73] Assignee: Wella Aktiengesellschaft, Darmstadt, Fed. Rep. of Germany

[21] Appl. No.: 870,767
[22] PCT Filed: Sep. 11, 1985
[86] PCT No.: PCT/EP85/00457
§ 371 Date: May 12, 1986
§ 102(e) Date: May 12, 1986
[87] PCT Pub. No.: WO86/01696
PCT Pub. Date: Mar. 27, 1986

[30] Foreign Application Priority Data

Sep. 11, 1984 [DE] Fed. Rep. of Germany ....... 3433246

[51] Int. Cl.4 .............................................. F26B 20/22
[52] U.S. Cl. .............................................. 34/3; 34/30; 34/34; 34/48; 34/54; 34/55; 34/100

[58] Field of Search ................. 34/46, 48, 50, 55, 100, 34/99, 3, 30, 34, 54

[56] References Cited

U.S. PATENT DOCUMENTS

| 2,271,857 | 2/1942 | Dwyer | 34/100 |
| 3,052,038 | 9/1962 | Harris | 34/100 |
| 3,082,540 | 3/1963 | Hiltenbrand | 34/100 |
| 4,385,452 | 5/1983 | Deschaaf et al. | 34/48 |

FOREIGN PATENT DOCUMENTS 0073944 3/1983 European Pat. Off. .
1079801 4/1960 Fed. Rep. of Germany .

Primary Examiner—Larry I. Schwartz
Attorney, Agent, or Firm—Michael J. Striker

[57] ABSTRACT

Mean values of the humidity of air in a return air duct (9) of a drying hood (1) are formed at equal measurement intervals by means of a differential measuring device process in a measurement (19). A first stop signal is transmitted from the measuring device (19) to a hair drying programme device (22) when a predetermined differential value of the measured air humidity mean values is achieved.

16 Claims, 3 Drawing Sheets

MEASURING AND CONTROLLING THE MOISTURE CONTENT OF HAIR

TECHNICAL FIELD

The invention relates to a method of measuring and controlling the moisture content of hair using a hair-drying hood with an air humidity sensor in the return air duct, and to a hood for use in such a method.

BACKGROUND ART

A drying process is known from the European Patent Application EP-A-0 073 944, in which the heating capacity is controlled automatically as a function of the relative air humidity measured by means of an air humidity sensor arranged in the return air duct. The disadvantage here is that the degree of moisture in the hair is not compared with the relative humidity of the outside air, so that a process of this type is extremely inaccurate and may lead to overdrying. In this connection a remedial measure is said to be provided in the form of a second air humidity sensor, which includes the relative humidity of the outside air in the drying process. The disadvantage here is still a large degree of measurement inaccuracy, since it is necessary to work from the fact that a comparative relative air humidity measurement is only possible when the temperatures of the return air and the outside air are the same; another disadvantage is the use of two sensors with characteristics which are not identical. An improvement in the accuracy of measurement is possible by means of a selected (expensive) pair (extensive correlation of the characteristics), but this also makes the device for performing the method expensive as a result of large circuit costs.

German Auslegeschrift DE-A2-10 79 801 discloses a drying process with two air humidity sensors. The relative humidity of the return air and the outside air is detected; the return air temperature is said to be brought to the temperature of the outside air by means of cooling fins and the application of outside air, in order that a comparative measurement of the relative air humidity can be made at equal temperatures. As a result of the strong return air flow an adjustment to the outside air temperature is not possible. In addition, the already mentioned disadvantages are present.

What is desired is a hair drying method which does not have the disadvantages or which makes exact measurement and control of the moisture content of the hair possible and prevents overdrying.

DISCLOSURE OF INVENTION

The present invention provides a method of measuring and controlling the moisture content of hair using a hair drying hood with an air humidity sensor in the return air duct, in which when the drying phase commences, a measuring device connected to the air humidity sensor produces mean values at equal time intervals, a first stop signal being transmitted from the measuring device to a hair drying programme device in order to introduce an automatic programme stop when a predetermined differential value of the measured air humidity mean values is not reached.

Proceding from the concept that the hair is considered to be dry when there is no longer any significant change in the moisture content of the exhaust air, this state and thus the end of the drying process can be determined using the method according to the invention.

In order to adapt the treated hair to the temperature and humidity of the surroundings and in order to reduce the excess remaining moisture of the hair without overdrying the hair, once a predetermined differential value (e.g. 0.1) of the measured mean values of the air humidity has been reached, the drying process continues at a reduced heat capacity and also a reduced fresh air capacity until a predetermined period of time has elapsed (e.g. 5 min).

To signal a warning for the end of the drying process a stop signal can advantagsously be used which, after a predetermined period of time and after a predetermined period of time of the reduced drying phase (reduction of the heat capacity/fresh air flow), also indicates by means of a timer the time which remains until the drying hood switches off. This device enables the operating personnel to adapt themselves optimally to the operation cycle.

Since the sensitivity of air humidity sensors is particularly high in the region of greater air humidity, it is easier with measuring means to detect return air which has been cooled by means of a heat exchanger chamber, since the relative air humidity is thereby increased.

It is also advantageous if the heat exchanger, preferably provided with cooling fins, is arranged in the fresh air flow of the ventilator.

A the hollow ring-shaped mixing chamber (preferably having cooling fins) provides for a good mixing of the return air and a good constructional adaptation in respect of the fresh air fan or the interior of the drying hood.

Similarly, a hollow ring-shaped heat exchanger chamber provides a good constructional adaptation and a good circulation of fresh air from the fan blower.

Drawing off of the return air via one or more return air ducts can be effected via a separate fan or by means of a fresh air fan, the underpressure being used for the drawing off.

An individualised drying programme is possible when a hair drying programme device is used. It is thus possible for example at full heat capacity in the first phase of drying to reduce the capacity according to a predetermined characteristic, by monitoring a temperature sensor. A correspondingly determined reduction in the fresh air flow leads to a drying process which protects the hair and is pleasant for the person undergoing the drying process.

A further advantage of the invention is seen in that air humidity sensors can be used which need no pronounced linearity on account of the differential measurement and consequently sensors can be used which are economical.

The invention is explained further, by way of example, with reference to the accompanying drawings.

BEST MODE FOR CARRYING OUT THE INVENTION

Figure 1:
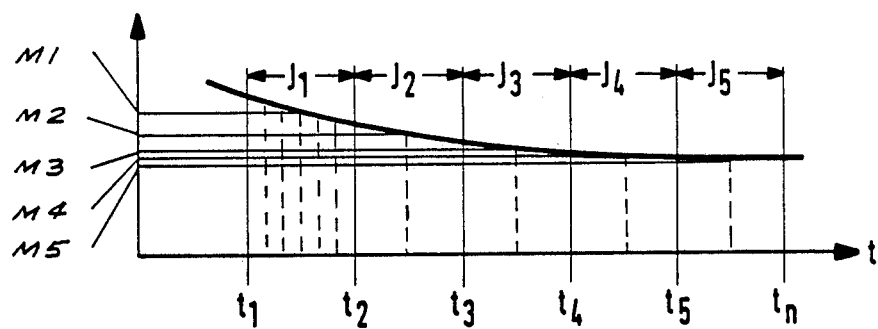
FIG. 1 shows a drying curve with the measurement intervals illustrated.

FIG. 1 is a graph of relative air humidity versus time, showing five measurement intervals $J_1$ to $J_5$. Six measurements taken at equal measuring time intervals indicated by dashed lines per an evaluation interval (J) of t=2 minutes have been found meet the requirements. From these first six measurement values in the first evaluation interval $J_1$ the mean value $M_1$ is derived and stored. Then the mean value $M_2$ from the next evaluation interval $J_2$ is derived from a further six measurements and stored. The mean value from interval $J_2$ is then subtracted from the mean value from interval $J_1$. If the differential value, i.e. the difference between the two mean values $M_1 - M_2$ is for example less then a reference value of $\pm 0.1$, then a first stop signal is produced.

A further mean value $M_3$ is derived from the interval $J_3$. If the substraction of the mean values derived from the intervals $J_2$ and $J_3$ results in a difference which is again less than $\pm 0.1$ for example, then the operating automatic programme is stopped by means of a second stop signal and switched over to a fixed time programme of for example 5 minutes length. This procedure prevents the operating automatic programme from being stopped in the event of erronous measurements. A first stop signal must therefore be confirmed by an immediately following second stop signal, for example $(J_1 - J_2)$ less than $\pm 0.1$ and $(J_2 - J_3)$ less than $\pm 0.1$.

If the first stop signal does not have an immediately following confirmation in the form of the immediately following differential measurement, if the differential value is for example greater than $\pm 0.1$, then the interval measurements and the automatic programme continue. If a predetermined differential value is not reached within an overall drying period, for example 60 minutes, then the drying hood switches off automatically.

Figure 2:
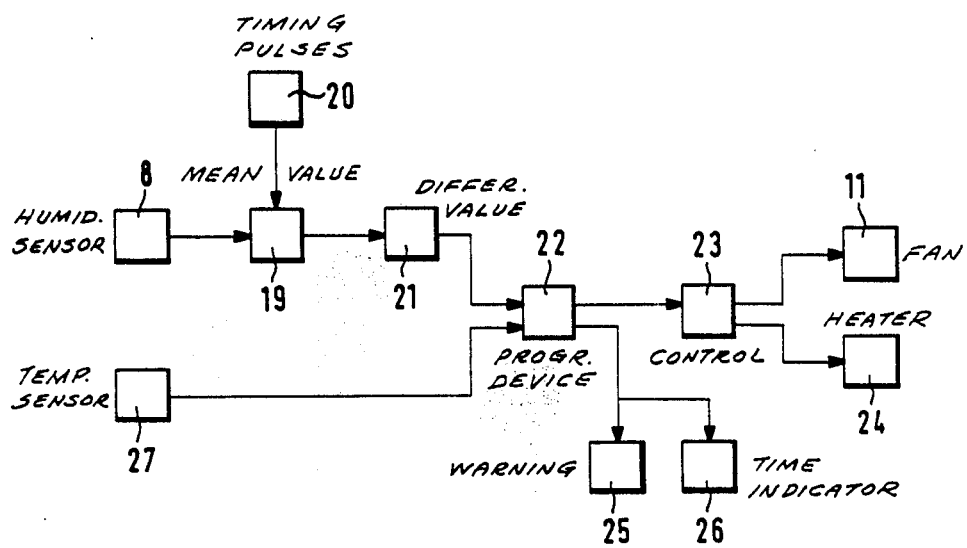
FIG. 2 is a block diagram illustrating a method according to the invention.

The block diagram represented in FIG. 2 illustrates the measurement process in a method according to the invention. A mean value measuring device 19 detects at equal measuring intervals the air humidity measurements of air humidity sensor 8 and at equal evaluation intervals $(J_1 \ldots J_n)$, which are time-controlled by means of a timing impulse generator 20 computes a mean value of the measurements for each evaluation interval. At the end of each interval $(J_1 \ldots J_n)$, timed by the impulse generator 20, the mean value is fed into a differential value measuring device 21 and stored here, a first stop signal then being produced when a predetermined difference of successive values has been reached. Differential value formation is activated in each case by the input of a new mean value. Only a second successive stop signal is effective to cause the hair drying programme device to allow heating means 24 and a fan or blower motor 11 to continue to operate at a reduced capacity at the end of a predetermined period of time via the hair drying control device 23 in the case of automatic operation of the hair drying hood 1. It may advantageously be provided that the second successive stop signal effects an optical and/or acoustic warning signal 25 indicating that the end of the drying process can shortly be expected, possibly with a time delay. A remaining time indicator 26 indicating the predetermined fixed time can be provided parallel thereto, the drying hood 1 being switched off when the remaining period "O" has been reached.

By means of a temperature sensor 27 connected to the hair drying programme device 22 the temperature of the exhaust air 3 can be monitored and/or controlled.

Furthermore, the hair drying programme device 22 can be equipped so that it can be adjusted for predetermined parameters (e.g. time, temperature, fan motor speed) in the non-automatic programme area.

Figure 3:
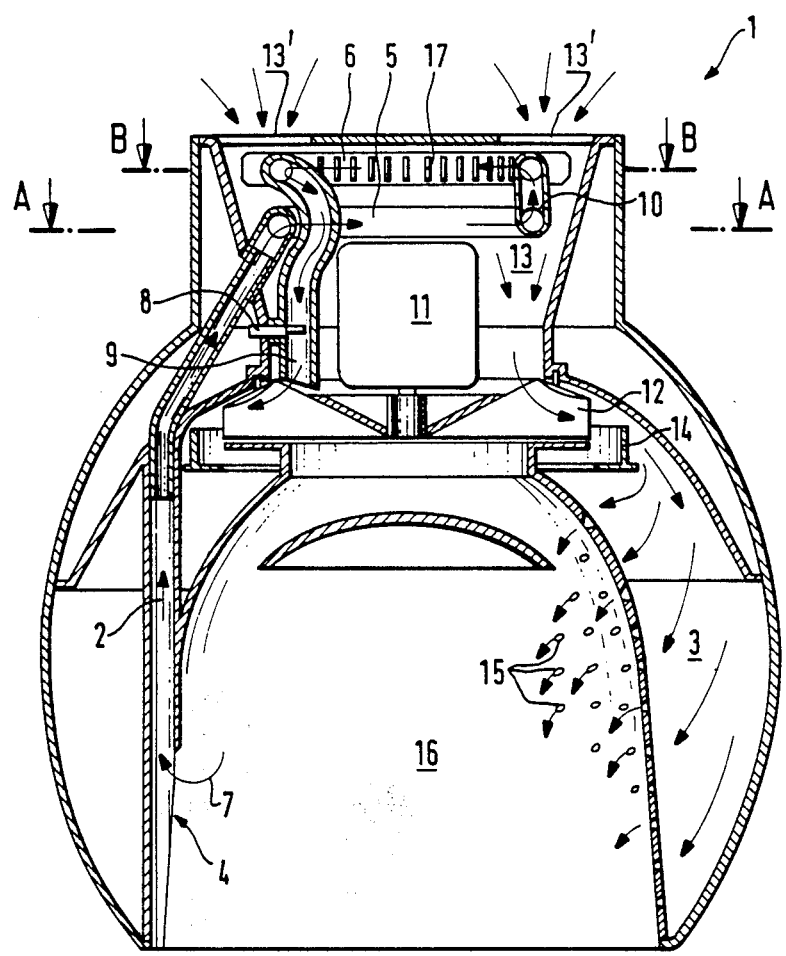
FIG. 3 is an axial section through a drying hood.

The drying hood 1 with air circulation shown in axial section in FIG. 3 comprises at least two return air ducts 2, which partly receive through openings 4 in the lower part of drying space 16 of the hood the drying exhaust air discharged from an exhaust air space 3 and circulating in drying space 16 treated around the hair (non-illustrated). The exhaust air is guided back as return air 7 via a mixing chamber 5 and a heat exchanger chamber 6 into a fresh air duct 13. The return air 7 flowing through the mixing chamber 5 and the heat exchanger chamber 6 acts upon an air humidity sensor 8 in a return air suction duct 9 communicating with the chamber 6. The outlet of the mixing chamber 5 and the inlet of the heat exchanger chamber 6 are connected by means of a connecting duct 10. The fan impeller 12, which is driven by means of a motor 11, sucks in the ambient fresh air through intake openings 13' at the top of hood 1 and and also draws the return air 7 emerging from the return air suction duct 9 for heating by a heating element 14. The heated air passes through, exhaust air chamber 3 and outlet openings 15 into the drying space 16.

For improved heat exchange, cooling fins 17 are arranged on the heat exchanger chamber 6 such that optimum circulation of fresh air is ensured. The cooling fins are arranged around all or part of the periphery of the hollow ring-shaped tube forming the heat exchanger chamber 6.

The suction opening of the return air outlet duct 9 is arranged at a slight distance from the impellor 12, the rotating impellor 12 creating an underpressure at the outlet opening. The underpressure drives the return air through the return air ducts 2, mixing chamber 5, connecting duct 10, heat exchanger chamber 6, and return air section duct 9.

Figure 4:
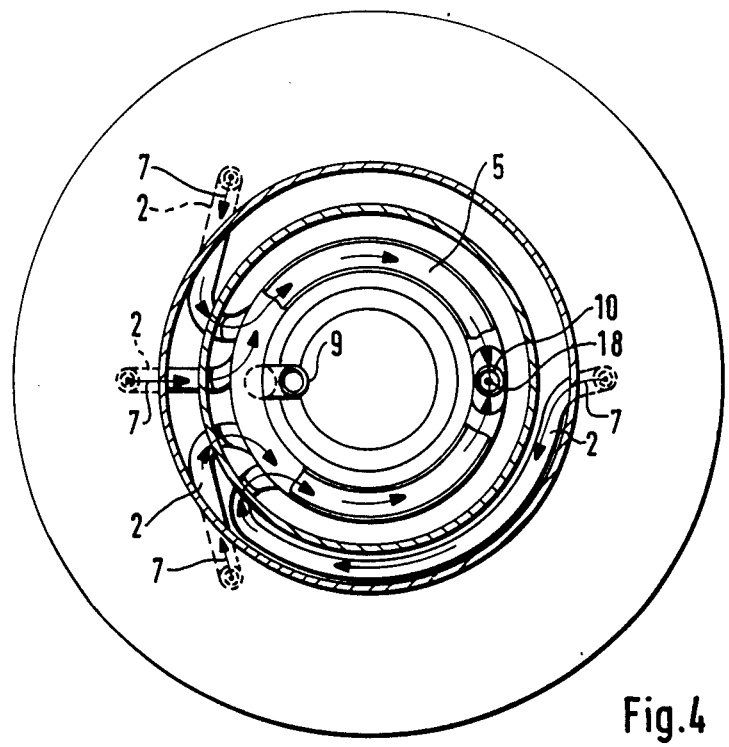
FIG. 4 is a section through the mixing chamber, taken along line A—A in FIG. 3.

FIG. 4 is a section through the hollow ring-shaped mixing chamber 5 taken along line A—A (FIG. 3). In the preferred embodiment shown here, four return air ducts 2 open collectively into the mixing chamber 5, the return air 7 from two return air ducts 2 in each case being mixed thoroughly in each mixing chamber half and flowing through the oppositely disposed outlet opening 18 into the connecting duct 10. This arrangement ensures that the distances covered by the return air 7 in the mixing chamber 5 are approximately equal.

Figure 5:
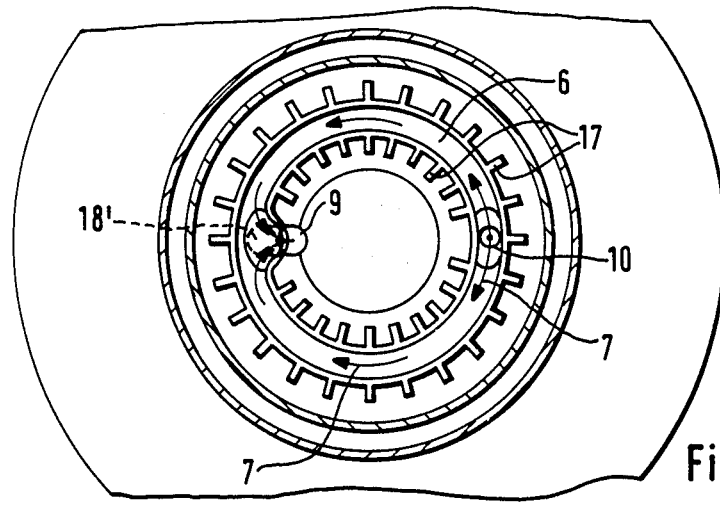
FIG. 5 is a section through the heat exchanger chamber, taken along line B—B in FIG. 3.

FIG. 5 is a section taken along line B—B (FIG. 3) through the hollow ring-shaped heat exchanger chamber 6. The return air 7 which passes through the connecting duct 10 into the heat exchanger chamber 6 divides into two partial currents, which each flow through one half of the heat exchanger chamber and flow into the return air outlet duct 9 on the oppositely disposed side. Cooling fins 17 are arranged around the heat exchanger chamber 6 for increased heat exchange.

We claim:

1. A method of measuring and controlling the moisture content of hair during an automatic drying process using a hair drying hood provided with a heater, a fan for drawing in ambient fresh air, and an air humidity sensor arranged in a duct for recirculating the drawn-in air, comprising the steps of measuring from the beginning of the drying process momentary values of air humidity signals detected by said sensor at equal measuring time intervals; computing at equal evaluation time intervals mean values of the measured momentary values; computing differential values from said mean values; comparing respective differential values with a predetermined reference value; and generating a first stop signal when a differential value falls below said reference value.

2. A method as claimed in claim 1 wherein said hair drying hood cooperates with a program device which controls the drying process, and further comprising the steps of computing a further differential value immediately following said first stop signal, comparing said further differential value with said reference value; generating a second stop signal when said further differential value falls below said reference value; and, switching over said program device in response to said second stop signal from an automatic control program to a fixed control program which continues the drying process at a reduced amount of heat and fresh air until a predetermined time period has elapsed.

3. A method as claimed in claim 2, in which, at the end of the fixed control program, the hair drying hood continues to operate at a reduced heat capacity and a reduced speed of the air fan until it is switched off manually.

4. A method as claimed in claim 2, in which the end of the fixed control program is indicated optically and/or acoustically.

5. A method as claimed in claim 2, in which the first stop signal actuates a remaining time indicator.

6. A device for measuring and controlling the moisture content of hair during an automatic drying process comprising a hair drying hood provided with a heater, a fan for drawing in ambient fresh air, and a duct for recirculating the drawn-in air; an air humidity sensor arranged in said duct; means for measuring at equal measuring time intervals momentary values of air humidity signals detected by said sensor and computing at equal evaluation time intervals mean values of the measured momentary values; means for computing a difference value between consecutive mean values; means for comparing the difference value with a predetermined reference value and generating a stop signal when a mean value falls below said reference value; and means for controlling said heater and said fan in response to said stop signal.

7. A device as defined in claim 6 wherein said control means include a program device for continuing said automatic drying process when said stop signal is generated, and terminating said process when a second stop signal is generated.

8. A device as defined in claim 7 wherein said program device terminates said automatic drying process after a fixed time period during which said heater and said fan are controlled to operate at a reduced capacity.

9. A hair drying hood for use in a device for measuring and controlling the moisture content of user's hair, comprising a drying space for enclosing said hair; an ambient air duct; an exhaust air chamber communicating with said ambient air duct and with said drying space; an air fan and a heater arranged between said ambient air duct and said exhaust air chamber; an annular mixing chamber having an outlet duct communicating with said ambient air duct opposite said fan; at least two, preferably four, return air ducts connecting said drying space with said mixing chamber; and an air humidity sensor arranged in said outlet duct for detecting humidity of mixed air flowing through said outlet duct from said mixing chamber and means for controlling said fan and heater in response to said detected humidity.

10. A hair drying hood as claimed in claim 9 wherein an annular heat exchanger chamber is connected between said outlet duct and said mixing chamber.

11. A hair drying hood as claimed in claim 10 wherein the mixing chamber and/or the heat exchanger chamber comprises cooling fins and is arranged in said ambient air duct.

12. A hair drying hood as claimed in claim 9 wherein the mixing chamber is designed as a hollow ring and said outlet duct being located opposite an inlet of a return air duct.

13. A hair drying hood as claimed in claim 10 wherein the mixing chamber is designed as a hollow ring and having an outlet opening communicating with a suction duct for the mixed air.

14. A hair drying hood as claimed in claim 13, wherein said air fan is arranged in said ambient air duct opposite an outlet of said suction duct to draw in the return air and the ambient air.

15. A hair drying hood as claimed in claim 9, in which the air humidity sensor is connected to a hair drying program device via a mean value measuring device which measures at equal time intervals the relative air humidity.

16. A hair drying hood according to claim 15 wherein the hair drying program device is connected to a temperature sensor.

* * * * *